United States Patent
Mi et al.

(10) Patent No.: US 11,668,502 B2
(45) Date of Patent: Jun. 6, 2023

(54) TRANSPORT REFRIGERATION SYSTEM AND A CAN ID DISTRIBUTING METHOD FOR THE TRANSPORT REFRIGERATION SYSTEM

(71) Applicant: Carrier Corporation, Palm Beach Gardens, FL (US)

(72) Inventors: Tingcan Mi, Shanghai (CN); Hai Tian, Shanghai (CN); Siwei Cai, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 233 days.

(21) Appl. No.: 17/132,867

(22) Filed: Dec. 23, 2020

(65) Prior Publication Data

US 2021/0199358 A1 Jul. 1, 2021

(30) Foreign Application Priority Data

Dec. 25, 2019 (CN) .......................... 201911355013.X

(51) Int. Cl.
  *F25B 49/00* (2006.01)
  *F25B 5/02* (2006.01)
  (Continued)

(52) U.S. Cl.
  CPC .............. *F25B 49/005* (2013.01); *F25B 5/02* (2013.01); *F25B 49/02* (2013.01); *H04L 12/40* (2013.01);
  (Continued)

(58) Field of Classification Search
  CPC .......... F25B 49/005; F25B 49/02; F25B 5/02; F25B 2500/222
  See application file for complete search history.

(56) References Cited

U.S. PATENT DOCUMENTS

| 5,437,163 A | 8/1995 | Jurewicz et al. |
| 6,996,997 B2 | 2/2006 | Wiff et al. |
| (Continued) | | |

FOREIGN PATENT DOCUMENTS

| CN | 203511428 U | 4/2014 |
| CN | 104050784 A | 9/2014 |
| (Continued) | | |

OTHER PUBLICATIONS

European Search Report for Application No. 20214717.9; dated May 25, 2021; 8 Pages.

*Primary Examiner* — Henry T Crenshaw
(74) *Attorney, Agent, or Firm* — Cantor Colburn LLP

(57) ABSTRACT

A transportation refrigeration system and a CAN ID allocation method for a transportation refrigeration system. The transportation refrigeration system includes: a refrigeration circuit including a compressor, a condenser, and a plurality of evaporators connected in parallel, all of which are connected to form a loop; a plurality of chambers, each of the evaporators being located in one of the chambers to adjust the chamber; a plurality of sensors of the same type, each of the sensors being installed in one of the chambers respectively; and a control unit, after being installed in place and energized, the plurality of sensors send their own identification codes to the control unit, and the control unit allocates a CAN ID to each of the sensors after receiving the identification codes of the sensors, so that the identification code of each sensor is bound to the corresponding CAN ID respectively.

10 Claims, 2 Drawing Sheets

(51) Int. Cl.
  *F25B 49/02*          (2006.01)
  *H04L 12/40*          (2006.01)
(52) U.S. Cl.
  CPC .............. *F25B 2500/222* (2013.01); *H04L 2012/40215* (2013.01); *H04L 2012/40273* (2013.01)

(56) References Cited

U.S. PATENT DOCUMENTS

| | | | |
|---|---|---|---|
| 8,354,927 | B2 | 1/2013 | Breed |
| 10,337,767 | B2 | 7/2019 | Senf, Jr. et al. |
| 2002/0112042 | A1* | 8/2002 | Coburn, II ............. H04L 67/12 709/223 |
| 2004/0031317 | A1* | 2/2004 | Norimatsu .......... B60C 23/0416 73/146.4 |
| 2009/0143923 | A1 | 6/2009 | Breed |
| 2010/0052903 | A1* | 3/2010 | Tiwari ................ G08B 25/003 340/541 |
| 2013/0073304 | A1* | 3/2013 | Kuntagod ............. G16H 40/63 705/2 |
| 2015/0308998 | A1 | 10/2015 | Suzuki et al. |
| 2017/0368910 | A1 | 12/2017 | Weber et al. |
| 2018/0180338 | A1* | 6/2018 | Honda ................... F25B 41/20 |

FOREIGN PATENT DOCUMENTS

| | | |
|---|---|---|
| CN | 104053613 A | 9/2014 |
| CN | 107323334 A | 11/2017 |
| CN | 108351137 A | 7/2018 |
| CN | 108351144 A | 7/2018 |
| CN | 110207411 A | 9/2019 |
| CN | 110226073 A | 9/2019 |
| CN | 110392811 A | 10/2019 |
| DE | 102007058438 A1 | 6/2009 |
| DE | 102017223890 A1 | 7/2019 |
| GB | 2554267 | 3/2018 |
| JP | S61155017 A | 7/1986 |
| KR | 20170127585 A | 11/2017 |
| WO | 2010007448 A1 | 1/2010 |
| WO | 2015100398 A1 | 7/2015 |
| WO | 2017109531 A1 | 6/2017 |

\* cited by examiner

TRANSPORT REFRIGERATION SYSTEM AND A CAN ID DISTRIBUTING METHOD FOR THE TRANSPORT REFRIGERATION SYSTEM

FOREIGN PRIORITY

This application claims priority to Chinese Patent Application No. 201911355013.X, filed Dec. 25, 2019, and all the benefits accruing therefrom under 35 U. S. C. § 119, the contents of which in its entirety are herein incorporated by reference.

TECHNICAL FIELD OF INVENTION

The present disclosure relates to the field of refrigeration systems, and more specifically, the present disclosure relates to a Controller Area Network (CAN) ID allocation method for a transportation refrigeration system, and a transportation refrigeration system.

BACKGROUND OF THE INVENTION

A transportation refrigeration unit (TRU) includes a refrigeration system, which may contain a flammable refrigerant. Therefore, a refrigerant leakage sensor needs to be arranged to detect whether the refrigerant is leaked. The refrigerant leakage sensor usually communicates with a control unit via a CAN bus. In a case where the transportation refrigeration unit includes a plurality of sensors, such as a plurality of sensors arranged in a plurality of chambers, each of the sensors needs to have its own CAN ID to achieve good communication. The method of pre-setting CAN ID is widely used, in which different part numbers (P/N) of various sensors are used to distinguish different sensors and different CAN IDs. It is necessary to ensure that sensors with different part numbers are distinguished in the entire process of production, use and maintenance of the product.

SUMMARY OF THE INVENTION

An object of the present disclosure is to solve or at least alleviate the problems existing in the related art.

A transportation refrigeration system is provided, which includes: a refrigeration circuit including a compressor, a condenser, and a plurality of evaporators connected in parallel, all of which are connected to form a loop; a plurality of chambers, each of the evaporators being located in one of the chambers to adjust the chamber; a plurality of sensors of the same type, each of the sensors being installed in one of the chambers respectively; and a control unit, wherein after being installed in place and energized, the plurality of sensors send their own identification codes to the control unit, and the control unit allocates a CAN ID to each of the sensors after receiving the identification codes of the sensors, so that the identification code of each sensor is bound to the corresponding CAN ID respectively.

In some embodiments, the plurality of sensors are sensors of the same type and with different identification codes, and each of the sensors is configured to detect refrigerant leakage occurring in one of the chambers respectively.

In some embodiments, when the sensor needs to be replaced, the sensor is removed and a replacement sensor is installed, and the replacement sensor sends its own identification code to the control unit after it is installed in place and energized; after receiving the identification code of the replacement sensor, the control unit allocates a CAN ID to the replacement sensor, so that the identification code of the replacement sensor is bound to the corresponding CAN ID.

In some embodiments, the control unit reports an error when receiving a repeated identification code, and prompts to replace the sensor that sends the repeated identification code.

In some embodiments, the control unit is configured to prompt a corresponding identification code when the sensor sends an alarm or has a fault.

A CAN ID allocation method for a transportation refrigeration system is also provided, the transportation refrigeration system including: a refrigeration circuit including a compressor, a condenser, and a plurality of evaporators connected in parallel, all of which are connected to form a loop; a plurality of chambers, each of the evaporators being located in one of the chambers to adjust the chamber; and a plurality of sensors of the same type, each of the sensors being installed in one of the chambers respectively, wherein the method includes: sending, by the sensors, their own identification codes to a control unit after the sensors are installed in place and energized; and allocating, by the control unit, a CAN ID to each of the sensors after the control unit receives the identification codes of the sensors, so that the identification code of each sensor is bound to the corresponding CAN ID respectively.

In some embodiments, the plurality of sensors are sensors of the same type and with different identification codes, and each of the sensors is configured to detect refrigerant leakage occurring in one of the chambers respectively.

In some embodiments, the method includes: removing the sensor when the sensor needs to be replaced, and installing a replacement sensor; and sending, by the replacement sensor, its own identification code to the control unit after it is installed in place and energized; and allocating, by the control unit, a CAN ID to the replacement sensor after the control unit receives the identification code of the replacement sensor, so that the identification code of the replacement sensor is bound to the corresponding CAN ID.

In some embodiments, the method includes reporting by the control unit an error when the control unit receives a repeated identification code, and prompting by the control unit to replace the sensor that sends the repeated identification code.

In some embodiments, the method includes configuring the control unit to prompt a corresponding identification code when the sensor sends an alarm or has a fault.

BRIEF DESCRIPTION OF THE DRAWINGS

With reference to the accompanying drawings, the disclosure of the present disclosure will become easier to understand. It can be easily understood by those skilled in the art that these drawings are only for illustrative purpose, and are not intended to limit the scope of protection of the present disclosure. In addition, similar numbers in the drawings are used to denote similar components, in which.

DETAILED DESCRIPTION OF THE INVENTION

Figure 1:
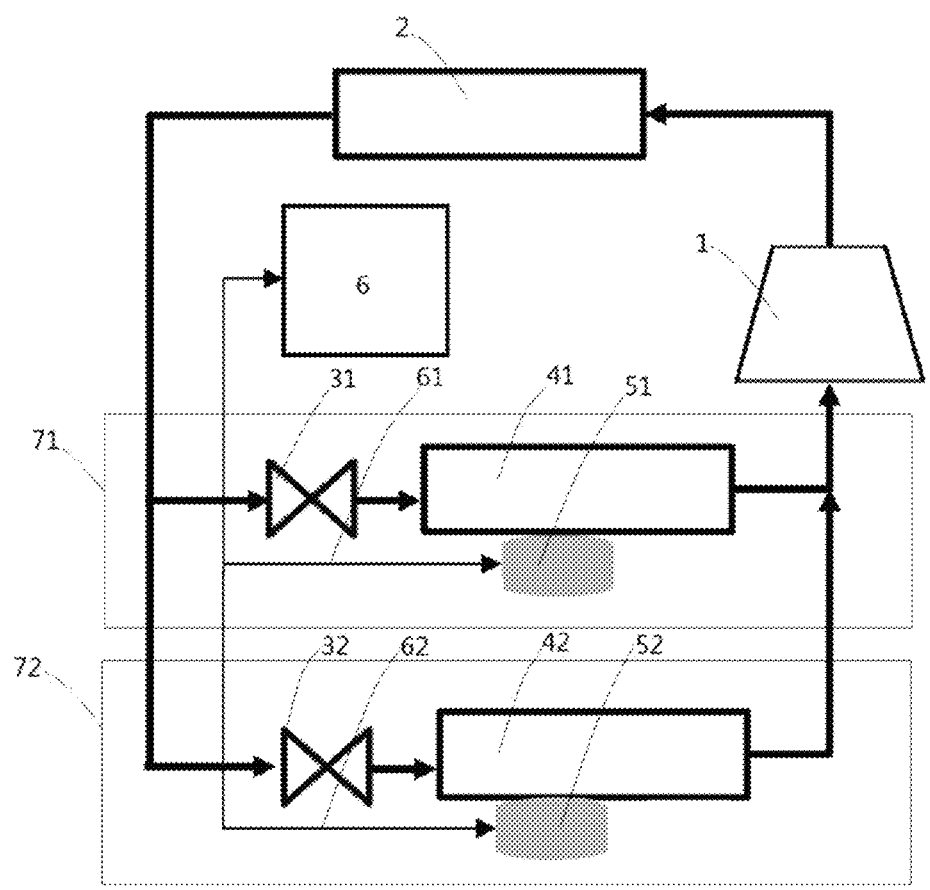
FIG. 1 shows a schematic structural view of a transportation refrigeration system according to an embodiment of the present disclosure.

Referring first to FIG. 1, a schematic structural diagram of a transportation refrigeration system according to the present disclosure is shown. The transportation refrigeration system according to the present disclosure includes a refrigeration circuit, which includes a compressor 1, a condenser 2, as well as a first evaporator 41 and a second evaporator 42 connected in parallel; a first expansion valve 31 is provided upstream of the first evaporator 41, and a second expansion valve 32 is provided upstream of the second evaporator 42. The first evaporator 41 and the first expansion valve 31 may be located in a first chamber 71 to adjust the temperature or the like of the first chamber 71. The first chamber 71 also includes a first sensor interface for installing a first sensor 51. The second evaporator 42 and the second expansion valve 32 may be located in a second chamber 72 to adjust the temperature or the like of the second chamber 72. The second chamber 72 includes a second sensor interface for installing a second sensor 52. In addition, the transportation refrigeration system may constitute a part of a transportation refrigeration unit (TRU). The transportation refrigeration unit may include a cab, a vehicle body, and a floor extending from the vehicle body. The first chamber 71 and the second chamber 72 may be defined by a cargo container arranged on the floor. The transportation refrigeration unit may also include engines and the like used to provide energy for vehicle driving and the transportation refrigeration system respectively. The transportation refrigeration unit and system according to the present disclosure includes the first chamber 71 and the second chamber 72, so that they can deal with situations such as two kinds of cargos with different requirements on storage conditions.

In existing solutions, sensors with different part numbers (P/N) are required, such as two types of sensors. For example, a first type of sensor is dedicated to be installed in the first chamber 71, and a second type of sensor is dedicated to be installed in the second chamber 72, so that the first sensor 51 and the second sensor 52 are distinguished by the part numbers. Through the system and method according to the present disclosure, the first sensor 51 and the second sensor 52 may be sensors of the same type and with the same part number, and the difference between the sensors may only lies in the identification code (barcode), which reduces the difficulty in operations such as purchase, installation, commissioning, and maintenance. More specifically, the first sensor 51 and the second sensor 52 may be sensors of the same type, and are installed in the first chamber 71 and the second chamber 72 respectively. After being installed in place, both the first sensor 51 and the second sensor 52 communicate with a control unit 6 (e.g., a microprocessor-based controller) via CAN buses 61 and 62. The first sensor 51 or the second sensor 52 sends its own identification code to the control unit 6 after it is installed in place and energized. After receiving the identification code of the first sensor 51 or the second sensor 52, the control unit 6 allocates a CAN ID to the corresponding sensor, so that the identification codes of the first sensor 51 and the second sensor 52 are respectively bound to one CAN ID. In this way, different CAN IDs can be allocated to the same type of sensors, and the CAN IDs will be bound to the identification codes of the sensors. By associating the identification codes of the sensors with the first chamber 71 or the second chamber 72, for example, by marking the identification codes at prominent positions of the first chamber 71 and the second chamber 72, the corresponding position at which each sensor is located, the identification code and the CAN ID can be easily known.

In some embodiments, the first sensor 51 and the second sensor 52 are configured to detect refrigerant leakage occurring in the first chamber 71 and the second chamber 72, respectively; that is, the first sensor 51 and the second sensor 52 are sensors adapted to detect refrigerant leakage, and such sensors are necessary when the refrigerant is a flammable refrigerant. In an alternative embodiment, the first sensor and the second sensor may be other types of sensors, such as temperature sensors, pressure sensors, or humidity sensors. In an alternative embodiment, a third sensor or more sensors of the same type as or different types from the first sensor and the second sensor may be included, and these sensors may also be allocated CAN IDs according to the method of the embodiment of the present disclosure. For example, in a transportation refrigeration unit that includes three chambers, each of the chambers includes a sensor, and the three sensors may also be allocated CAN IDs through corresponding systems and methods.

In some embodiments, when the first sensor 51 or the second sensor 52 has a fault and needs to be replaced, the first sensor 51 or the second sensor 52 is removed, and a replacement sensor of the same type or a different type is installed. Just like when the first sensor or the second sensor was installed for the first time, the replacement sensor will send its own identification code to the control unit 6 after it is installed in place and energized. After receiving the identification code of the replacement sensor, the control unit 6 will allocate a CAN ID to the replacement sensor so that the identification code of the replacement sensor is bound to one CAN ID. Therefore, after the sensor in the transportation refrigeration system according to the embodiment of the present disclosure fails, it can be easily substituted by the replacement sensor of the same or different type, and the replacement sensor will obtain the CAN ID corresponding to its identification code after being installed in place. The whole process is convenient and easy to operate, and there is no need to manually identify the type of sensor installed.

In some embodiments, the control unit 6 reports an error when receiving a repeated identification code, and prompts to replace the first sensor 51 or the second sensor 52. In some embodiments, the control unit is configured to provide a corresponding identification code when the first sensor 51 or the second sensor 52 sends an alarm (such as when a leaked refrigerant is detected) or has a fault. For example, the fault or alarm type and the identification code of the sensor which sends an alarm or has a fault is displayed on the vehicle display screen, thereby conveniently notifying the driver of the location and type of the alarm or fault.

Figure 2:
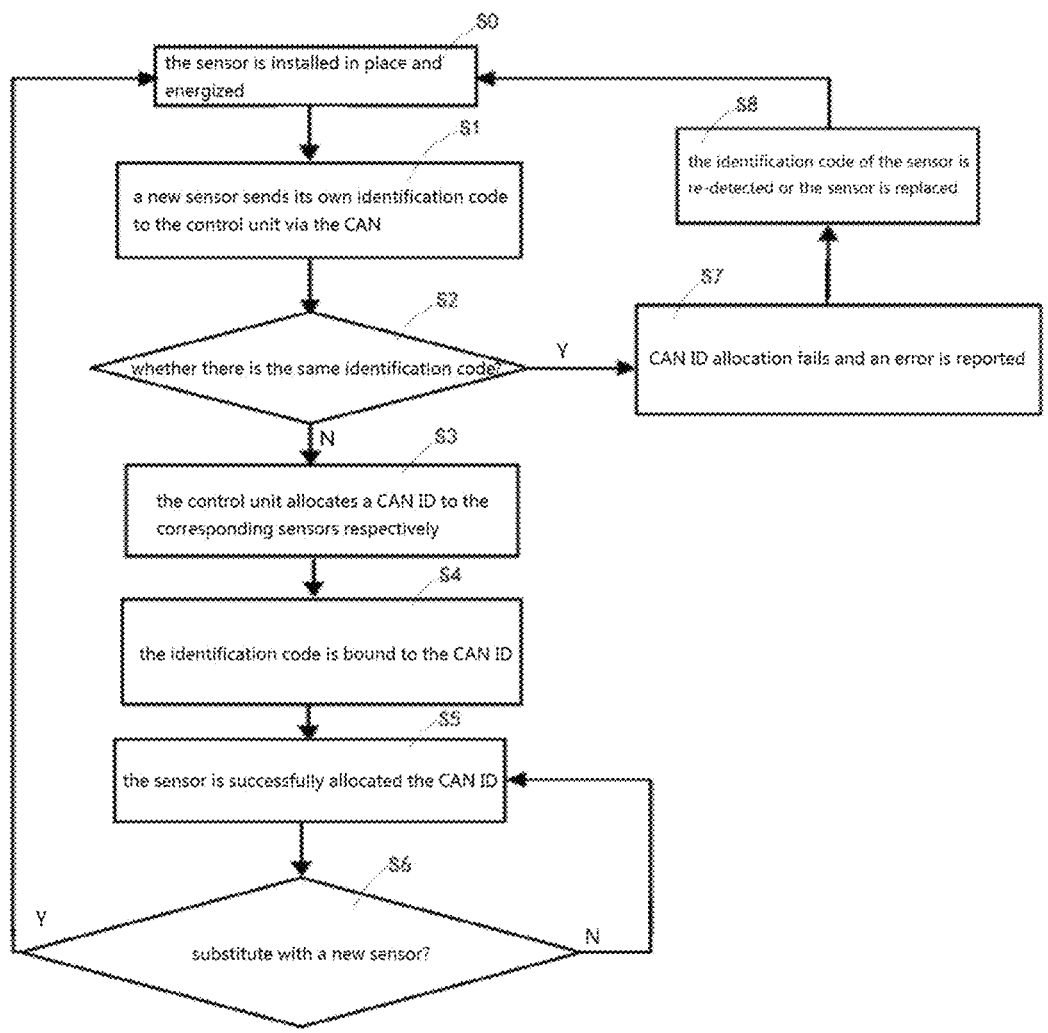
FIG. 2 shows a schematic flowchart of a CAN ID allocation method for a transportation refrigeration system according to an embodiment of the present disclosure.

With continued reference to FIG. 2, according to another aspect of the present disclosure, a CAN ID allocation method for a transportation refrigeration system is provided. The transportation refrigeration system is of the type shown in FIG. 1 and includes: a refrigeration circuit, which includes a compressor 1, a condenser 2, and a first evaporator 41 and second evaporator 42 connected in parallel; a first chamber 71, wherein the first evaporator 41 is located in first chamber 71 to adjust the temperature and the like of first chamber 71, and the first chamber includes a first sensor interface for installing a first sensor 51; and a second chamber 72, wherein the second evaporator 42 is located in the second chamber 72 to adjust the temperature or the like of the second chamber 72, and the second chamber 72 includes a second sensor interface for installing the second sensor 52; the first sensor 51 and the second sensor 52 are sensors of the same type, and are respectively installed in the first chamber 71 and the second chamber 72 for detecting temperatures thereof or the like; the method includes: sending, by the first sensor 51 or the second sensor 52, its own identification code to the control unit 6 after the sensor is installed in place and energized; and allocating, by the control unit 6, a CAN ID to the corresponding sensor after receiving the identification code of the first sensor 51 or the second sensor 52, so that the identification codes of the first sensor 51 and the second sensor 52 are bound to the corresponding CAN IDs respectively. According to the method of the present disclosure, there is no need to distinguish the types of the sensors in stages such as purchase, transportation and assembly of the sensors, and the binding of the sensor's identification code and CAN ID can be simply completed in the commissioning process after the installation is completed, which simplifies the production process and reduces the possibility of manual error.

In some embodiments, the first sensor and the second sensor are configured to detect refrigerant leakage occurring in the first chamber and the second chamber, respectively. In an alternative embodiment, the first sensor and the second sensor can be configured to detect other parameters such as temperature, humidity or pressure in the first chamber and the second chamber. In some embodiments, the method includes: removing the first sensor or the second sensor when the first sensor or the second sensor needs to be replaced, and installing a replacement sensor, wherein after the replacement sensor is installed in place and energized, the replacement sensor sends its own identification code to the control unit; after receiving the identification code of the replacement sensor, the control unit allocates a CAN ID to the replacement sensor, so that the identification code of the replacement sensor is bound to one CAN ID. In some embodiments, the method includes reporting by the control unit an error when the control unit receives a repeated identification code, and prompting by the control unit to replace the first sensor or the second sensor. In some embodiments, the method includes configuring the control unit to provide a corresponding identification code when the first sensor or the second sensor sends an alarm or has a fault.

More specifically, according to a specific embodiment, the method may include:

Step S0: in which the sensor is installed in place and energized;

Step S1: in which a new sensor sends its own identification code to the control unit via the CAN bus;

Step S2: in which it is judged whether there is the same identification code; if yes, S7 is executed; otherwise, S3 is executed;

Step S3: in which the control unit allocates a CAN ID to the corresponding sensors respectively based on the identification codes of the sensors;

Step S4: in which the identification code is bound to the CAN ID;

Step S5: in which the sensor is successfully allocated the CAN ID;

Step S6: in which it is judged whether to substitute with a new sensor; if yes, step S1 is executed again; otherwise, step S5 is executed;

Step S7: in which CAN ID allocation fails and an error is reported; and

Step S8: in which the identification code of the sensor is re-detected or the sensor is replaced.

It should be understood that the above steps S1-S8 are only illustrative, those skilled in the art can modify specific steps without departing from the principle of the present disclosure, and these modifications should also be included in the scope of the present disclosure. According to the method of the embodiment of present disclosure, there is no need to distinguish the sensors in stages such as purchase, transportation and installation, and it is only required to allocate the CAN ID based on the sensor's own identification code during the commissioning process, which reduces the possibility of manual errors during the operation and simplifies the process.

The specific embodiments described above are merely for describing the principle of the present disclosure more clearly, and various components are clearly illustrated or depicted to make it easier to understand the principle of the present disclosure. Those skilled in the art can readily make various modifications or changes to the present disclosure without departing from the scope of the present disclosure. Therefore, it should be understood that these modifications or changes should be included within the scope of protection of the present disclosure.

What is claimed is:

1. A transportation refrigeration system, comprising:
   a refrigeration circuit comprising a compressor, a condenser, and a plurality of evaporators connected in parallel, all of which are connected to form a loop;
   a plurality of chambers, each of the evaporators being located in one of the chambers to adjust the chamber, the plurality of chambers defined by a cargo container on a vehicle;
   a plurality of sensors of the same type, each of the sensors being installed in one of the chambers respectively; and
   a control unit, wherein after being installed in place and energized, the plurality of sensors send their own identification codes to the control unit, and the control unit allocates a CAN ID to each of the sensors after receiving the identification codes of the sensors, so that the identification code of each sensor is bound to the corresponding CAN ID respectively.

2. The transportation refrigeration system according to claim 1, wherein the plurality of sensors are sensors of the same type and with different identification codes, and each of the sensors is configured to detect refrigerant leakage occurring in one of the chambers respectively.

3. The transportation refrigeration system according to claim 1, wherein when the sensor needs to be replaced, the sensor is removed and a replacement sensor is installed, and the replacement sensor sends its own identification code to the control unit after it is installed in place and energized; after receiving the identification code of the replacement sensor, the control unit allocates a CAN ID to the replacement sensor, so that the identification code of the replacement sensor is bound to the corresponding CAN ID.

4. The transportation refrigeration system according to claim 1, wherein the control unit reports an error when receiving a repeated identification code from one sensor of the plurality of sensors.

5. The transportation refrigeration system according to claim 1, wherein the control unit is configured to display an identification code of a sensor of the plurality of sensors when the sensor sends an alarm or has a fault.

6. A CAN ID allocation method for a transportation refrigeration system, the transportation refrigeration system comprising:
   a refrigeration circuit comprising a compressor, a condenser, and a plurality of evaporators connected in parallel, all of which are connected to form a loop;
   a plurality of chambers, each of the evaporators being located in one of the chambers to adjust the chamber, the plurality of chambers defined by a cargo container on a vehicle; and
   a plurality of sensors of the same type, each of the sensors being installed in one of the chambers respectively, wherein the method comprises:
sending, by the sensors, their own identification codes to a control unit after the sensors are installed in place and energized; and
allocating, by the control unit, a CAN ID to each of the sensors after the control unit receives the identification codes of the sensors, so that the identification code of each sensor is bound to the corresponding CAN ID respectively.

7. The method according to claim 6, wherein the plurality of sensors are sensors of the same type and with different identification codes, and each of the sensors is configured to detect refrigerant leakage occurring in one of the chambers respectively.

8. The method according to claim 6, further comprising:
removing the sensor when the sensor needs to be replaced, and installing a replacement sensor; and
sending, by the replacement sensor, its own identification code to the control unit after it is installed in place and energized; and allocating, by the control unit, a CAN ID to the replacement sensor after the control unit receives the identification code of the replacement sensor, so that the identification code of the replacement sensor is bound to the corresponding CAN ID.

9. The method according to claim 6, comprising reporting by the control unit an error when the control unit receives a repeated identification code from one sensor of the plurality of sensors.

10. The method according to claim 6, comprising configuring the control unit to display an identification code of a sensor of the plurality of sensors when the sensor sends an alarm or has a fault.

* * * * *